Figure 1:
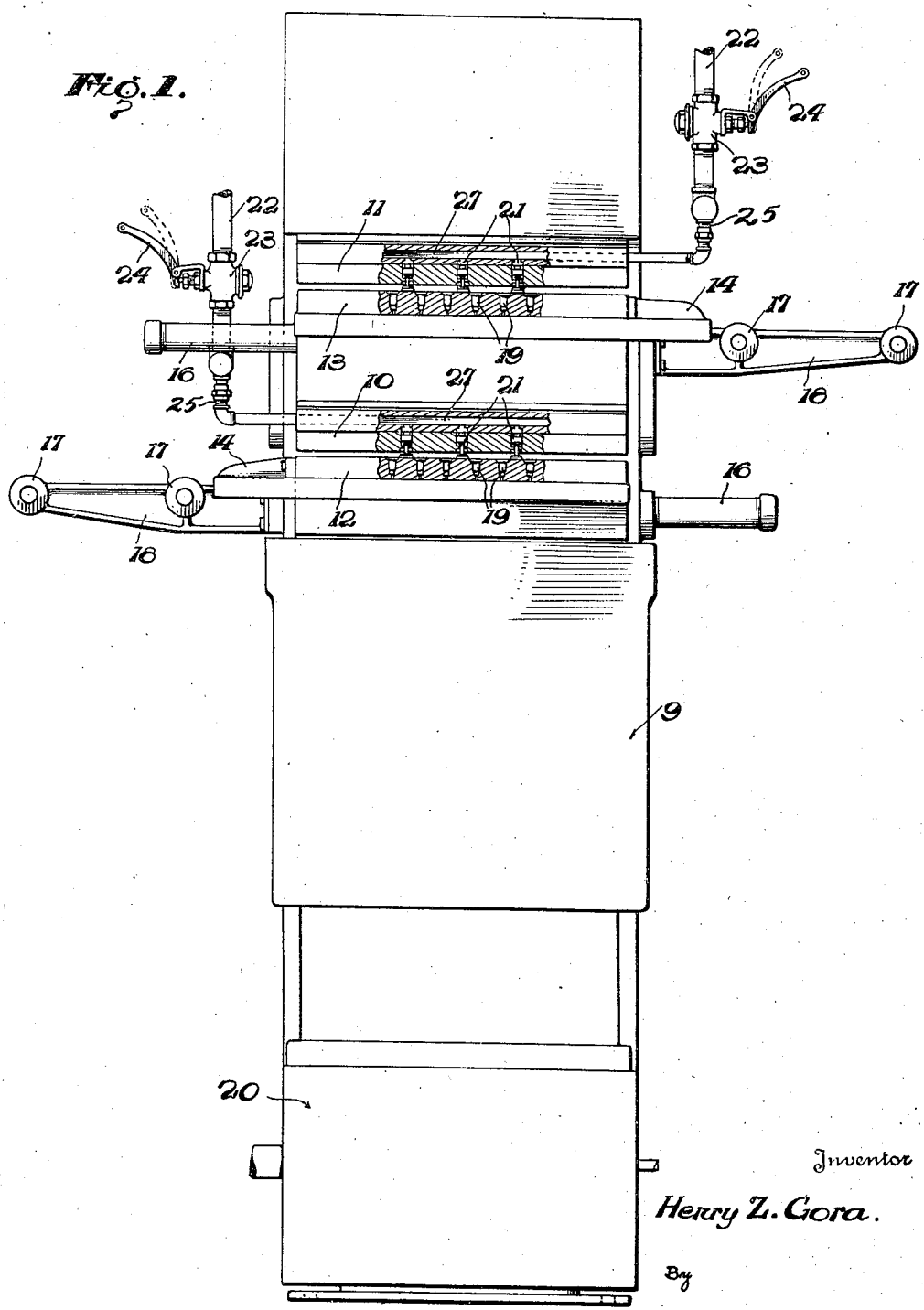

March 23, 1943.   H. Z. GORA   2,314,823
MOLDING APPARATUS
Filed Aug. 10, 1939   2 Sheets-Sheet 1

Inventor
Henry Z. Gora.
By
Cameron, Kerkam & Sutton Attorneys

March 23, 1943. H. Z. GORA 2,314,823
MOLDING APPARATUS
Filed Aug. 10, 1939 2 Sheets-Sheet 2
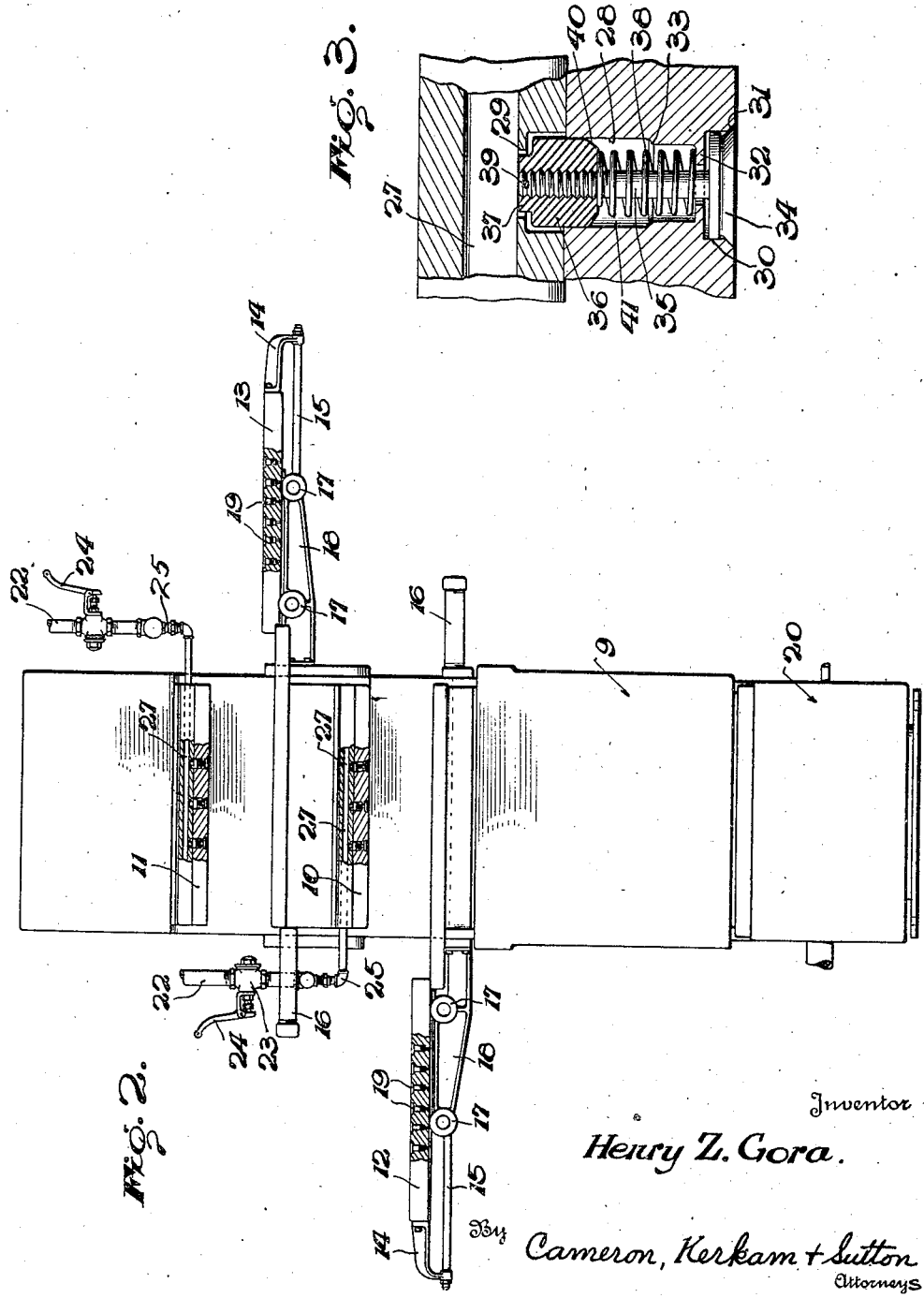
Inventor
Henry Z. Gora.
By Cameron, Kerkam + Sutton
Attorneys Patented Mar. 23, 1943

2,314,823

UNITED STATES PATENT OFFICE 2,314,823

MOLDING APPARATUS

Henry Z. Gora, Bridgeport, Conn., assignor to Jenkins Bros., New York, N. Y., a corporation of New Jersey Application August 10, 1939, Serial No. 289,485

11 Claims. (Cl. 18—34)

This invention relates to a molding apparatus, particularly molding apparatus for rubber-tire-valve stems, and even more particularly to means for stripping and ejecting the molded elements, as valve stems.

It is an object of this invention to provide a device of the type characterized which facilitates the rapid operation of molding apparatus in large scale production.

Another object of this invention is to provide a device of the type characterized which is relatively simple in construction, easy to manipulate and highly efficient in operation.

Another object of this invention is to provide improved stripping and ejecting apparatus which is automatic in operation and which in rapid sequence first strips the molded article and then effects its ejection.

Another object of this invention is to provide a device of the type last characterized which is operated by pneumatic pressure and which in rapid succession breaks the adherence of the molded article to the mold and then moves to eject the molded article from the mold.

Another object of this invention is to provide a device of the type last characterized wherein the aforesaid ejecting operation stops further escape of air so as to prevent wastage of the compressed air.

Another object of this invention is to provide stripping and ejecting apparatus as characterized which may operate simultaneously on a plurality of molded articles.

Another object of this invention is to provide stripping and ejecting apparatus which is simple in construction, being formed of relatively few parts, and which is also certain and rapid in operation.

Other objects will appear as the description of the invention proceeds.

The invention is capable of receiving a variety of mechanical expressions one of which is illustrated on the accompanying drawings, but it is to be expressly understood that the drawings are for purposes of illustration only and are not to be construed as a definition of the limits of the invention, reference being had to the appended claims for that purpose.

Referring in detail to the accompanying drawings, wherein the same reference characters are employed to designate corresponding parts in the several figures, Fig. 1 is an elevation, somewhat diagrammatic, of a molding apparatus embodying the present invention, certain parts being shown in section.

Fig. 2 is a corresponding view on a somewhat smaller scale illustrating the molding apparatus in open position; and Fig. 3 is an enlarged elevation, partly in axial section, of the stripping and ejecting apparatus embodying the present invention.

The invention may be embodied in any suitable apparatus for molding simultaneously a number of similar articles and which presents the problem hereinafter discussed more particularly in conjunction with the molding of rubber valve stems, but as the invention has particular utility in connection with the molding of rubber valve stems, it has been illustrated and will be described as so employed, although as will be apparent to those skilled in the art the invention is susceptible to other uses, and such are contemplated.

The molding apparatus per se may be of any suitable construction, and therefore it has not been illustrated in detail. Preferably the molding is effected by a hydraulic press 9, and to facilitate rapid production of the molded articles the press preferably includes two stationary mold halves 10 and 11 fixed in the press and two movable mold halves 12 and 13 which are movable laterally into and out of the press, so that one of said movable mold halves may be unloaded and loaded while the other movable mold half is in the press and the molding operation is going on. As both pairs of cooperating mold halves are of like construction, it will be sufficient to describe one.

Movable mold half 12 is connected by a bracket 14 to the piston rod 15 of a hydraulic ram 16, so that it may be moved into and out of the press, said mold half 12 sliding on rollers 17 carried by the frame 18. Mold half 12 contains any suitable number of cavities 19 in which the stems are to be formed. Said cavities are preferably arranged in a plurality of parallel rows as indicated in Figs. 1 and 2, any suitable number of rows being employed and any suitable number of cavities in each row. The stationary mold half is provided with a corresponding number of pins (omitted from the illustration in the interest of clearness), which are designed to enter the cavities 19 and provide the usual passage extending axially through the stem.

Assuming that the tire stem valve is to be made of rubber vulcanized in the mold and to be of a known construction including a metal insert embedded in the rubber at the free end of the stem, the cavities 19 are first charged with the metal inserts while the mold half 12 is in the position shown in Fig. 2, said inserts being centered in the cavities in any suitable way, and then each cavity is provided with a slug of raw rubber of appropriate size for the production of the stem to be molded in the cavity. Ram 16 is then actuated by the admission of hydraulic pressure and, through the piston rod 15, the movable mold half 12 is moved from the position shown in Fig. 2 into the press and into alignment with the stationary mold half 10. The mold halves are then closed by applying pressure to the hydraulic cylinder of the press (not shown but diagrammatically indicated at 20), low pressure being first used to close the mold halves and then high pressure being used to effect the molding operation. Thereby the rubber slugs are forced into the mold cavities to produce dense homogeneous elements shaped to the contour of said cavities. The mold is then held closed under a suitable temperature for a predetermined time to insure proper vulcanization according to the preferred procedure referred to. The molding operation, owing to the normal use of an excess of rubber in each slug so as to assure that no cavities are left by reason of a deficiency of rubber, forces the excess rubber laterally from the cavities, whereby the several stems, which normally include lateral flanges at the base thereof as illustrated by the form of the mold cavities are united in the plane of said flanges so that at the face of the upper mold half said flanges are united more or less completely into a continuous sheet of rubber that tends to adhere fixedly to the underface of the upper mold half.

The means for first stripping or breaking the adherence of this sheet to the upper mold half and then ejecting the molded elements off of the pins heretofore referred to and projecting downwardly from the upper mold half, are preferably disposed, as shown at 21 in Fig. 1, so that each stripping and ejecting member has its axis midway between the axes of two adjacent mold cavities 19, whereby the stripping and ejecting means now to be described acts simultaneously on the flanges of two adjacent molded stems, or said member might also be disposed midway between rows so as to act on four adjacent stems. Said stripping and ejecting means is preferably operated by pneumatic pressure, and to this end the molding apparatus is provided with a conduit 22 leading from any suitable source of compressed air to a suitable quick-opening globe valve 23, here shown as manually operable by the lever 24, from which a pipe 25 leads to a suitable header in a stationary part of the press. Communicating with said header are manifolds 27 corresponding with each row of stripping and ejecting means 21, as will be apparent from an inspection of Figs. 1 and 2, or if preferred as many pipes 25 as there are manifolds 27 may branch from the common compressed air line referred to.

Each stripping and ejecting means is of like construction, and therefore a description of one will be sufficient. An axially extending recess 28 (Fig. 3), which may be of any suitable cross-section, communicates with the manifold 27 through an aperture 29 and at its opposite end has an enlargement 30 which at its extremity flares outwardly as shown at 31 to provide a valve seat. Immediately above the enlargement 30, as shown in Fig. 3, said recess has an inwardly extending flange 32, above which the recess is of somewhat smaller cross-section than the main portion thereof so as to provide a tapered or inclined valve seat 33 at the junction between said portions of different diameter. Mounted within said recess is a stripping and ejecting member including a head 34 which preferably conforms in size and shape to the enlarged portion 30 of said recess and which has an outwardly inclined extremity adapted to seat at 31 and constitute a valve preventing flow of air therepast as well as admission of the molded material to said recess. Projecting from the rear of said head 34 is a stem 35 upon which is mounted in any suitable way, as by a threaded connection, a block or head 36 conforming in cross-section to the recess 28 and making only a small clearance therewith for a purpose to be explained. Block 36 has its upper extremity, as viewed in Fig. 3, provided with a portion 37 of smaller cross-section than the block 36 which is adapted to enter but not fill the aperture 29. Interposed between the flange 32 and the block 36 is a coil spring 38 whose tension may be adjusted by adjustment of the block 36 on its threaded connection to the stem 35, after which the block may be locked against displacement in any suitable way, as by a pin 39. The inner end of block 36 has a tapered surface 40 adapted to seat on surface 33 and constitute a valve therewith.

Assume that the molding operation has been completed and that the valve controlling the press has been actuated to initiate separating movement of the mold halves. Simultaneously with or immediately after the actuation of said valve for effecting the opening of the movable mold half, air valve 23 is opened by lever 24 to admit compressed air to the manifold 27. At this time the parts of the stripping and ejecting apparatus are in the relationship shown in Fig. 3. The compressed air passes around the periphery of the extension 37 on block 36 and, by reason of the small clearance between the block 36 and the recess 28, it enters the chamber 41 in said recess that is between the heads 34 and 36, where it builds up a pressure because the head 34 is tightly seated at 31 under the action of the spring 35 so that air may not escape therepast. The head 34 being of larger cross-section than block 36, as shown in Fig. 3, an unbalanced pressure is thereby established on the head 34, and as the movable mold half recedes from the stationary mold half, head 34 may follow the movable mold half under this unbalanced pneumatic pressure. Thereby the compressed air will flow past the seat 31 against the rubber sheet at the face thereof adjacent the stationary mold half, breaking any suction existing therebetween and thereby stripping the rubber sheet from the stationary mold half. As soon as the adhesion of the rubber sheet to the stationary mold half has thus been broken, the compressed air is free to flow into the atmosphere and the pressure in the chamber 41 thereupon promptly drops to nearly if not substantially atmospheric pressure. As the full pressure of the compressed air is still operating on the upper face of the block 36 as viewed in Fig. 3, an unbalanced pressure now exists on said block 36, causing it to move downwardly against the tension of spring 35, as viewed in Fig. 3, and thereby forcing the head 34 to operate on the adjacent flanges of the molded stems to force the same from their pins and cause the sheet of stems, by reason of the simultaneous action of all said stripping and ejecting means, to drop from the upper mold member onto the lower mold member. Block 36 is moved forwardly by this unbalanced pressure until its tapered end 40 seats on the tapered surface 33, which coact to constitute a valve shutting off further escape of compressed air from the chamber 41 and thereby conserve the air under pressure.

By operating the valve which controls ram 16 the lower mold half may now be moved out of the press and the sheet of stems readily separated therefrom. Thereupon a new set of inserts, rubber slugs, etc., are supplied to the mold cavities, which may be done during the period when the stems in the other mold of the press are being vulcanized, and then the operation may be repeated.

By suitably proportioning the surfaces on the head 34 and 36 and the pressure of air used, any desired unbalanced pressures may be provided for first stripping the sheet from the stationary mold half and thereafter ejecting the sheet therefrom. The actual stripping is largely done by the compressed air, the head 34 being actuated to break the seal between the rubber and the stationary mold half at a localized area into which the air under pressure is admitted so that it may proceed radially outwardly with respect to said area to thereby strip the sheet from the stationary mold half. Thereafter the unbalanced pressure acting on the head 36 causes the stripping and ejecting member to move forward quickly and exert an ejecting thrust sufficient to remove the stems from the pins, but the forward movement of each ejecting member is limited by the contact of the surface 40 with the surface 33, which acts as a seal to prevent further loss of compressed air.

The ejecting members will remain in this forward position as long as the pressure is maintained in the manifold 27, but as soon as the valve 23 is actuated to discontinue the application of compressed air and properly vent said manifold 27, the parts are returned to the position shown in Fig. 3 under the action of the coil spring 38. Thereby the seal at surface 31 is again established, and this seal not only provides for the building up of the air pressure in the chamber 41 at the next admission of compressed air thereto, but it also effectively prevents any flow of the molded material between the head 34 and the wall of the surrounding recess to interfere with the subsequent proper operation of the stripping and ejecting member.

It will therefore be perceived that by the present invention improved stripping and ejecting means have been provided whereby the adhesion of the molded articles to the stationary mold head is promptly broken and thereafter the molded articles are ejected from the stationary mold half, and this is effected in each instance by the use of a single member which performs these functions in sequence. Said ejecting means are of relatively simple construction, being composed of few parts, and they are rapid and certain in operation. Moreover, they function to prevent wastage of compressed air and by reason of their construction and operation, they may be readily designed to provide the desired ejecting thrust and the desired speed of operation. Thereby the present invention facilitates rapid operation of molding apparatus in large quantity production and this is effected by means of relatively simple construction that is easily manipulated, and certain and efficient in operation.

While the embodiment of the invention illustrated on the drawings has been described with considerable particularity it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts, and certain features may be used without other features, without departing from the spirit of this invention. Reference is therefore to be had to the appended claims for a definition of this invention.

What is claimed is:

1. In molding apparatus of the type employing relatively movable mold members, means for first stripping and then ejecting the molded element from one of said mold members including means providing a recess, means communicating with said recess for conveying fluid under pressure thereto, an ejector member operated by fluid pressure in said recess to admit stripping fluid to the face of the mold, a second member connected to said ejector member and operated by fluid pressure to move said ejector member to ejecting position, and a third means in said recess for discontinuing the flow of pressure fluid when said ejector member is moved to ejecting position.

2. In molding apparatus of the type employing relatively movable mold members, means for first stripping and then ejecting the molded element from one of said mold members including means providing a recess, means communicating with said recess for conveying fluid under pressure thereto, and rectilinearly movable means in said recess including a pair of heads of different effective cross-sectional areas connected by a stem of smaller cross-section than said heads, the larger of said heads providing an ejector member cooperating with one end of said recess to constitute a valve and prevent flow of pressure fluid therepast, said second head being spaced from said ejector member to provide a chamber in which pressure fluid may accumulate and escape to effect a stripping action when said valve is opened by the excess pressure acting thereon, and said second head constituting a plunger having a clearance with the wall of said recess which is smaller than the effective opening provided by said valve when opened by said excess pressure whereby said plunger is moved in said chamber by said pressure fluid acting exteriorly thereon when the pressure in said chamber has been released by opening said valve.

3. In molding apparatus of the type employing relatively movable mold members, means for first stripping and then ejecting the molded element from one of said mold members including means providing a recess, means communicating with said recess for conveying fluid under pressure thereto, an ejector member cooperating with one end of said recess to constitute a valve and prevent flow of pressure fluid therepast, a second member connected to said ejector member and making a small clearance with the wall of said recess, said second member being spaced from said ejector member to provide a space in said recess in which pressure fluid may accumulate and escape to effect a stripping action when said valve is opened, said second member constituting a plunger movable in said recess by said pressure fluid when the pressure in said space has been released, and means in said recess engaged by said plunger to provide a valve for discontinuing the flow of pressure fluid when said ejector member has been moved by said plunger to ejecting position.

4. In molding apparatus of the type employing relatively movable mold members, means for first stripping and then ejecting the molded element from one of said mold members including means providing a recess, means communicating with said recess for conveying fluid under pressure thereto, and an ejector means mounted in said recess and provided with spaced heads connected by a stem of smaller cross-section than said heads, one of said heads cooperating with one end of said recess to provide a valve, and the other of said heads cooperating with the wall of said recess to provide a small clearance to admit pressure fluid to the space in said recess between said heads, said first named head having a larger effective area in said recess than said second named head whereby an unbalanced pressure tending to unseat said first named head exists when pressure fluid is admitted to said space, and the clearance between said second named head and the wall of said recess being less than the effective opening provided by said first named head when unseated whereby the flow of pressure fluid past said second named head is less than the flow of pressure fluid past said first named head when unseated to produce an unbalanced pressure applied externally on said second named head when the pressure in the space between said heads has been released by opening said valve.

5. In molding apparatus of the type employing relatively movable mold members, means for first stripping and then ejecting the molded element from one of said mold members including means providing a recess, means communicating with said recess for conveying fluid under pressure thereto, and an ejector means mounted in said recess and provided with spaced heads, one of said heads cooperating with one end of said recess to provide a valve, and the other of said heads cooperating with the wall of said recess to provide a small clearance to admit pressure fluid to the space in said recess between said heads, said first named head having a larger effective area in said recess than said second named head whereby an unbalanced pressure tending to unseat said first named head exists when pressure fluid is admitted to said space, and the clearance between said second named head and the wall of said recess restricting the flow of pressure fluid past said second named head to produce an unbalanced pressure thereon when the pressure in the space between said heads has been released, and cooperating means on the wall of said chamber and on said second named head to discontinue flow of pressure fluid when said second named head has been moved to limit position.

6. In molding apparatus of the type employing relatively movable mold members, means for first stripping and then ejecting the molded element from one of said mold members including means providing a recess, means communicating with said recess for conveying a pressure fluid thereto, and an ejector means mounted in said recess and provided at its opposite extremities with spaced heads connected by a stem of smaller cross-section than said heads, one of said heads cooperating with one end of said recess to provide a valve, resilient means normally holding said valve closed, the other of said heads making a small clearance with the wall of said recess to admit pressure fluid into the space between said heads when said valve is closed but providing a smaller effective passage for flow of pressure fluid than is provided by said valve when opened whereby an unbalanced pressure is applied exteriorly to said second named head for moving said means on an ejecting stroke when said valve is open.

7. In molding apparatus of the type employing relatively movable mold members, means for first stripping and then ejecting the molded element from one of said mold members including means providing a recess, means communicating with said recess for conveying a pressure fluid thereto, and an ejector means mounted in said recess and provided at its opposite extremities with spaced heads, one of said heads cooperating with one end of said recess to provide a valve, resilient means normally holding said valve closed, the other of said heads making a small clearance with the wall of said recess to admit pressure fluid into the space between said heads when said valve is closed but restricting flow past said second named head to provide an unbalanced pressure thereon for moving said means on an ejecting stroke when said valve is open, and means on said second named head and on the wall of said recess to provide a second valve for discontinuing the flow of fluid pressure when said second named head has been moved to limit position by the pressure on said second named head.

8. In molding apparatus of the type employing relatively movable mold members, means for first stripping and then ejecting the molded element from one of said mold members including means providing a recess, means in communication with said recess for conveying pressure fluid thereto, and an ejector means mounted in said recess and provided with spaced heads at its opposite extremities connected by a stem of smaller cross-section than said heads, one of said heads and the corresponding end of said recess being provided with coacting surfaces to provide a valve preventing outflow of pressure fluid and inflow of molding material, a spring acting on said means and normally maintaining said surfaces in sealing contact, the other of said heads cooperating with the wall of said recess to provide a small clearance for admitting pressure fluid to the space in said recess between said heads, said second named head being of smaller effective area in said recess than said first named head whereby the pressure fluid in the space between said heads moves said first named head to separate said surfaces and admit pressure fluid to the face of the mold for initiating a stripping operation, said clearance between said second named head and the wall of said recess being less than the effective area for flow of pressure fluid past said first named head when said first named head is unseated to provide an exteriorly applied unbalanced force on said second named head to move said means and effect an ejecting stroke thereof when the pressure fluid in the space between said heads has been released by opening said valve.

9. In molding apparatus of the type employing relatively movable mold members, means for first stripping and then ejecting the molded element from one of said mold members including means providing a recess, means in communication with said recess for conveying pressure fluid thereto, and an ejector means mounted in said recess and provided with spaced heads at its opposite extremities, one of said heads and the corresponding end of said recess being provided with coacting surfaces to provide a valve preventing outflow of pressure fluid and inflow of molding material, a spring acting on said means and normally maintaining said surfaces in sealing contact, the other of said heads cooperating with the wall of said recess to provide a small clearance for admitting pressure fluid to the space in said recess between said heads, said second named head being of smaller effective area in said recess than said first named head whereby the pressure fluid in the space between said heads moves said first named head to separate said surfaces and admit pressure fluid to the face of the mold for initiating a stripping operation, but said clearance between said second named head and the wall of said recess restricting flow of pressure fluid to provide an unbalanced force on said second named head to move said means and effect an ejecting stroke thereof when the pressure fluid in the space between said heads has been released, and coacting surfaces on said second named head and on the wall of said recess which coact to discontinue flow of pressure fluid when said means has been moved to the limit of its ejecting stroke.

10. In molding apparatus of the type employing relatively movable mold parts adapted to mold a plurality of elements which are joined and tend to adhere to one of said mold parts, means for first stripping the sheet of joined elements from said mold parts and then ejecting the same therefrom including a plurality of ejector members each disposed approximately midway between a plurality of molding elements, means providing a recess in which each of said ejector members is movably mounter, means communicating with each recess for conveying pressure fluid thereto, each of said members having spaced heads connected by a stem of smaller cross-section than said heads and providing a space in said recess between said heads in which pressure fluid may accumulate, one of said heads cooperating with one end of said recess to provide a valve to prevent flow of pressure fluid when said valve is closed, and movable by accumulated fluid pressure in said space to open said valve and release the pressure in said space to effect stripping of said molded article from said mold, and said second named head making a relatively small clearance with the wall of said recess to provide a passage for flow of pressure fluid past said second named head which is less than the effective area for flow of pressure fluid past said first named head when unseated whereby release of said pressure in said space unbalances the pressure on said second named head and said fluid pressure acts exteriorly on said second named head to move said ejector member on its ejecting stroke.

11. In a molding apparatus of the type employing relatively movable mold parts adapted to mold a plurality of elements which are joined and tend to adhere to one of said mold parts, means for first stripping the sheet of joined elements from said mold parts and then ejecting the same therefrom including a plurality of ejector members each disposed approximately midway between a plurality of molding elements, means providing a recess in which each of said ejector members is movably mounted, means communicating with each recess for conveying pressure fluid thereto, each of said members having spaced heads providing a space in said recess between said heads in which pressure fluid may accumulate, one of said heads cooperating with one end of said recess to provide a valve to prevent flow of pressure fluid when said valve is closed, and movable by accumulated fluid pressure in said space to open said valve and release the pressure in said space to effect stripping of said molded article from said mold, and said second named head making a relatively small clearance with the wall of said chamber whereby release of said pressure in said space unbalances the pressure on said second named head and fluid pressure moves said second named head to move said ejector member on its ejecting stroke, and cooperating means on said second named head and on the wall of said recess to provide a valve for discontinuing the flow of pressure fluid when said member has made its ejecting stroke.

HENRY Z. GORA.